June 16, 1931. J. B. RAY ET AL 1,810,853
CHRISTMAS TREE STAND
Filed July 24, 1930
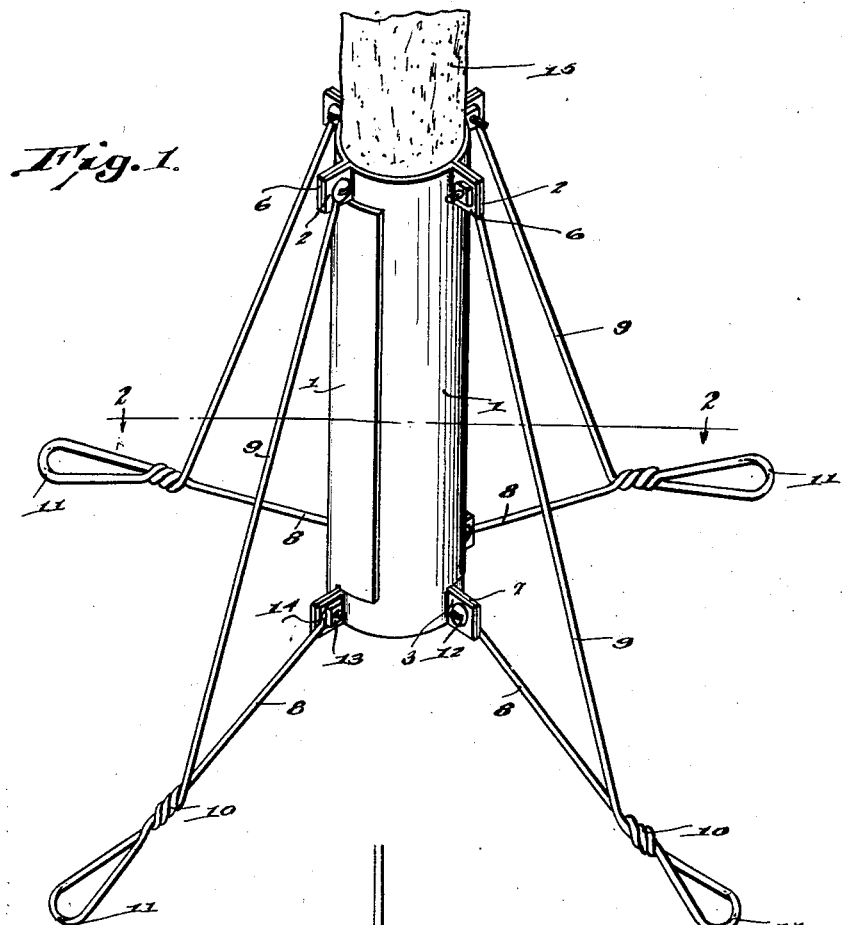
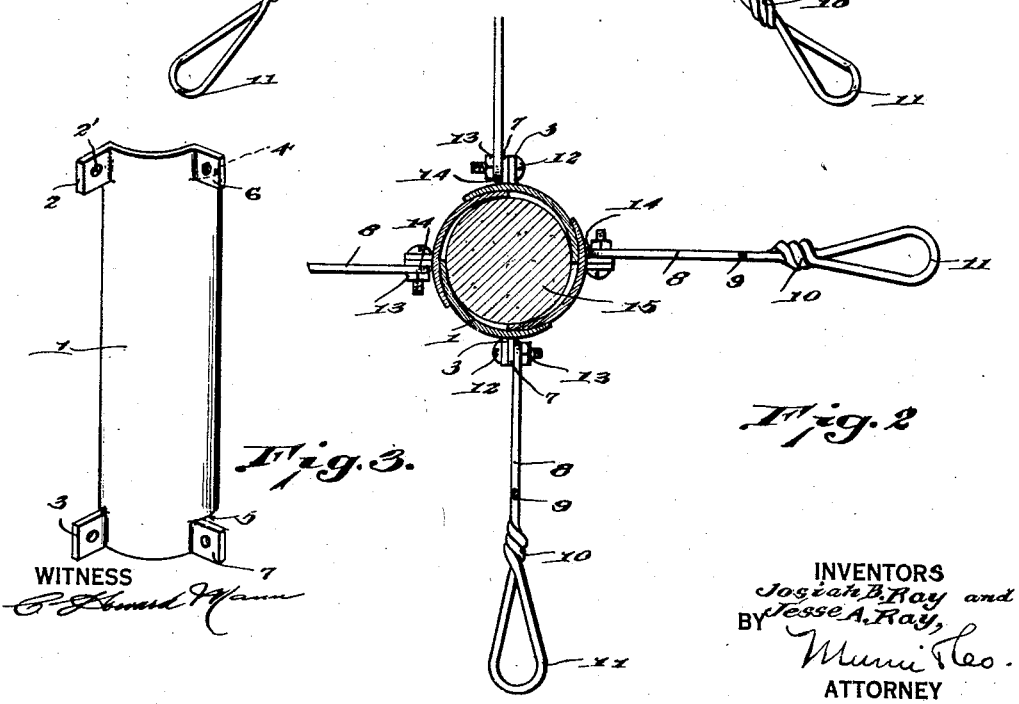
INVENTORS
Josiah B. Ray and
Jesse A. Ray,
BY
ATTORNEY
WITNESS Patented June 16, 1931

1,810,853

UNITED STATES PATENT OFFICE

JOSIAH B. RAY AND JESSE A. RAY, OF DECATUR, INDIANA

CHRISTMAS TREE STAND

Application filed July 24, 1930. Serial No. 470,482.

Our invention relates to improvements in holders for Christmas trees and the like, and it consists in the combination and arrangements herein described and claimed.

An object of our invention is to provide a Christmas tree holder of light weight but which is strong and stable.

A further object of the invention is to provide a holder which may be adjusted to hold trees of different sizes.

A further object is to provide an adjustable holder for Christmas trees in which the parts of the holder overlap and in which by manipulating holding bolts the parts may be moved so as to accommodate a tree trunk of greater or less diameter but at the same time completely surround the trunk.

Other objects and advantages will appear in the following specification and the novel features of the invention will be particularly pointed out in the appended claims.

Our invention is illustrated in the accompanying drawings forming part of this application in which:—

Figure 1 is a perspective view of the holder as applied to a tree trunk.

Figure 2 is a section along the line 2—2 of Figure 1.

Figure 3 is a perspective view of one of the section holding plates.

In carrying out our invention we provide a plurality of holding or retaining plates such as that shown in Figure 3. This comprises a body portion 1 preferably of sheet metal which is curved substantially on an arc of a circle. The body portion is provided at one edge with lower and upper ears 2 and 3 respectively. At the opposite edge are cut-away portions 4 and 5 respectively. Adjacent to the cut-away portion 4 is an ear 6 while a similar ear 7 is adjacent to the cut-away portion 5. Each ear is provided with an opening such as shown at 2'. Legs are provided, each leg consisting of a single piece of bent wire having a lower portion 8 and a diagonally extending upper portion 9. The portions 9 and 8 are twisted together at 10 to form an adjacent loop 11 which constitutes a foot member.

In the present case we have shown four holding members which have four legs. In assembling the device the sections are secured together by passing bolts 12 through adjacent ears. Nuts 13 are applied to the bolts. Each leg portion 8 is provided with a hook or eye 14 through which the bolt 12 passes. The ears 2 of adjacent sections fit in the cut-away portions 4 while the ears 3 fit in the cut-away portions 5.

In the Figure 1 we have shown the ears of adjacent sections there being in contact with one another, and the body portions 1 of the various sections in contact with the tree trunk 15.

If the tree trunk should happen to be larger, it is only necessary to unscrew the nuts to such a distance as will permit the sliding of the body portions 1 relative to each other, so as to make the cylindrical holding member of which the body portions are a part large enough to admit the tree trunk, and the nuts then can be tightened to securely hold the tree trunk in position. It will be seen that we have provided a simple device for holding Christmas trees which can be readily adjusted to trees of various sizes.

We claim:—

1. A tree holder comprising a plurality of curved plates disposed in overlapping relation, each of said plates having a plurality of ears, means passing through the ears of adjacent plates for securing them together, and a plurality of legs, each of said legs having a portion secured to one of said ears and another portion secured to another of said ears.

2. A tree holder comprising a plurality of curved plates disposed in overlapping relation, each of said plates having a plurality of ears, means passing through the ears of adjacent plates for securing them together, and a plurality of legs, each of said legs having a portion secured to one of said ears and another portion secured to another of said ears, each of said legs comprising a single piece of twisted wire.

3. In a Christmas tree holder, a plurality of overlapping curved metal plates, each of said plates having an upper and lower ear on one edge thereof, and being provided with cut-away portions at the upper and lower corners of the opposite edge and having ears extending laterally, said last named ears being disposed adjacent to said cut-away portions.

JOSIAH B. RAY.
JESSE A. RAY.